United States Patent [19]

Briggs et al.

[11] Patent Number: 5,091,991
[45] Date of Patent: Feb. 25, 1992

[54] OPTICAL FIBER CONNECTOR WITH ALIGNMENT FEATURE

[75] Inventors: Robert C. Briggs, Newport; Bryan T. Edwards, Camp Hill; David D. Sonner, Harrisburg; Robert N. Weber, Hummelstown, all of Pa.

[73] Assignee: Amp Incorporated, Harrisburg, Pa.

[21] Appl. No.: 660,507

[22] Filed: Feb. 25, 1991

[51] Int. Cl.[5] ............................................. G02B 6/26
[52] U.S. Cl. ........................................ 385/82; 385/83; 385/52; 385/89; 385/92
[58] Field of Search ............... 350/96.20, 96.21, 96.22, 350/96.23

[56] References Cited

U.S. PATENT DOCUMENTS

| | | | |
|---|---|---|---|
| 4,167,303 | 9/1979 | Bowen et al. | 350/96.21 |
| 4,470,660 | 9/1984 | Hillegonds et al. | 350/96.21 |
| 4,478,485 | 10/1984 | Khoe et al. | 350/96.20 |
| 4,611,887 | 9/1986 | Glover et al. | 350/96.21 |
| 4,645,295 | 2/1987 | Pronovost | 350/96.20 |
| 4,715,675 | 12/1987 | Kevern et al. | 350/96.20 |
| 4,736,100 | 4/1988 | Vastagh | 250/227.11 |
| 4,762,388 | 8/1988 | Tanaka et al. | 350/96.20 |
| 4,787,706 | 11/1988 | Cannon, Jr. et al. | 350/96.20 |
| 4,798,440 | 1/1989 | Hoffer et al. | 350/96.20 |
| 4,802,728 | 2/1989 | Komatsu | 350/96.20 |
| 4,840,451 | 6/1989 | Sampson et al. | 350/96.20 |
| 4,872,736 | 10/1989 | Myers et al. | 350/96.20 |
| 4,960,317 | 10/1990 | Briggs et al. | 350/96.21 |
| 4,979,792 | 12/1990 | Weber et al. | 350/96.20 |
| 5,005,939 | 4/1991 | Arvanitakis et al. | 350/96.20 |
| 5,016,968 | 5/1991 | Hammond et al. | 350/96.20 |

OTHER PUBLICATIONS

Optimate Catalog 88-812, AMP Incorporated, 3/89, pp. 5-18.

Primary Examiner—Brian Healy

[57] ABSTRACT

A connector (7) for joining light transmitting fiber cables (9) to a transmitter and/or receiver device (3) comprises a plug half connector (6) and a yoke half connector (5). The plug half connector (6) comprises a plug (8) having axial extending bore (35) for receiving an optical fiber, a transceiver adapter (10) adapted to axially receive the plug (8) and extending axially for aligning the plug (8) relative to the transmitter and/or receiver device (3). Further the transceiver adapter (10) has a forward mating face (27). A pin (13) is beveled at its end (47) and is fixed to the forward mating face (27) of the tranceiver adapter (10) and extends forward of the plug half connector (6). The yoke half connector (5) is attached to and is integral with the transmitter and/or receiver device (3) and has an aperture (19) therein beveled (20) to receive the pin (13) to be guided into the aperture (19) by the beveling (20).

12 Claims, 4 Drawing Sheets

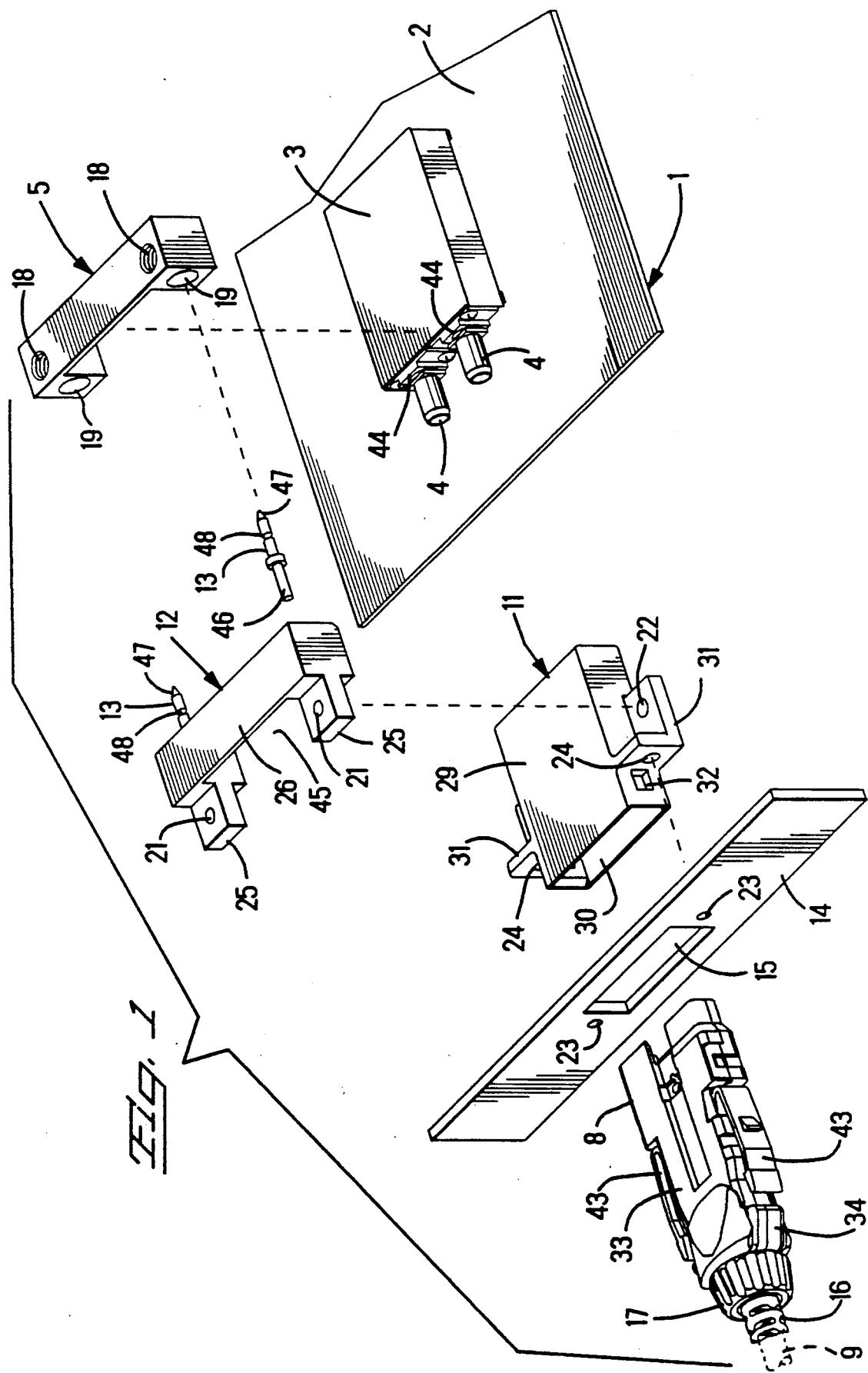

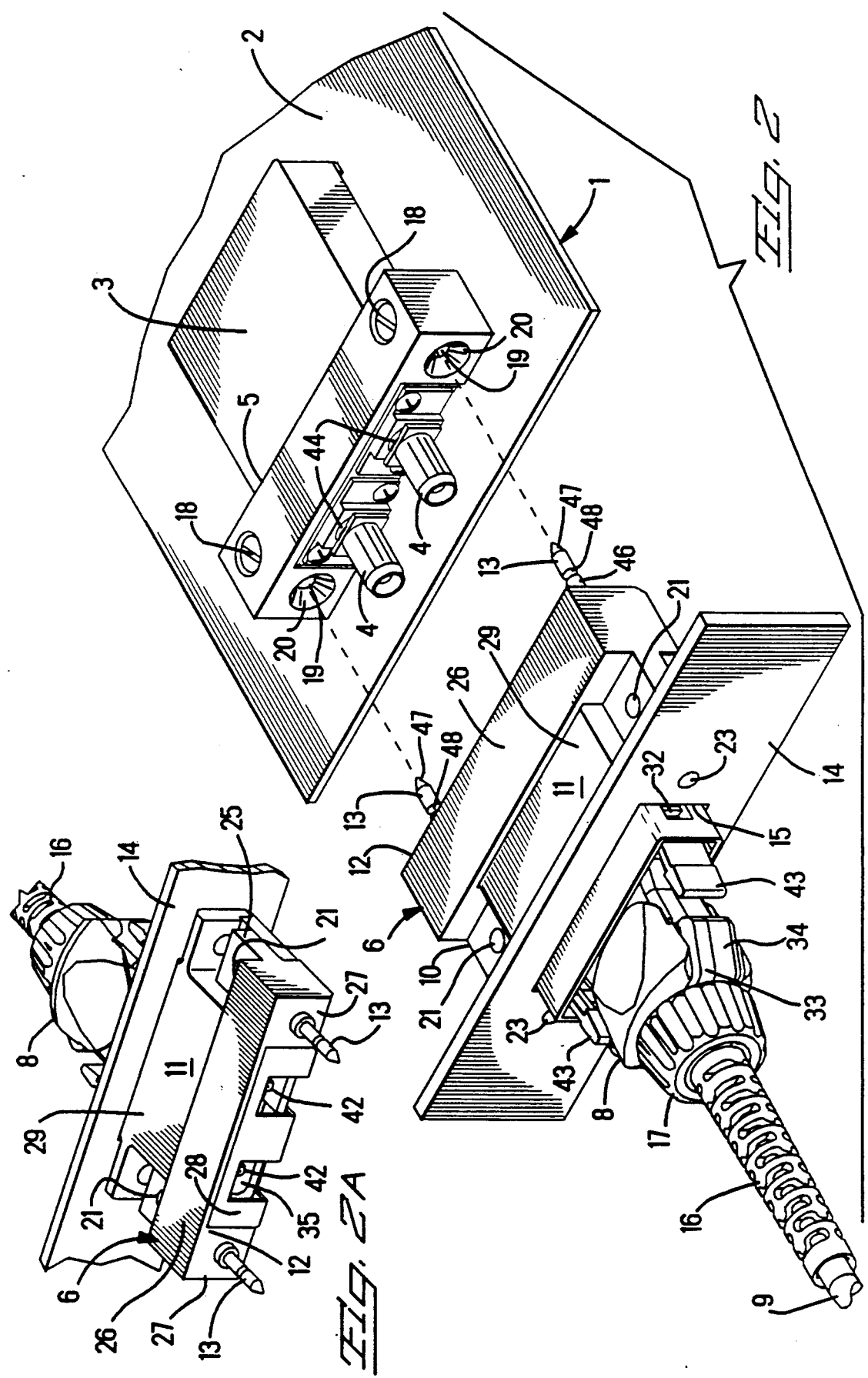

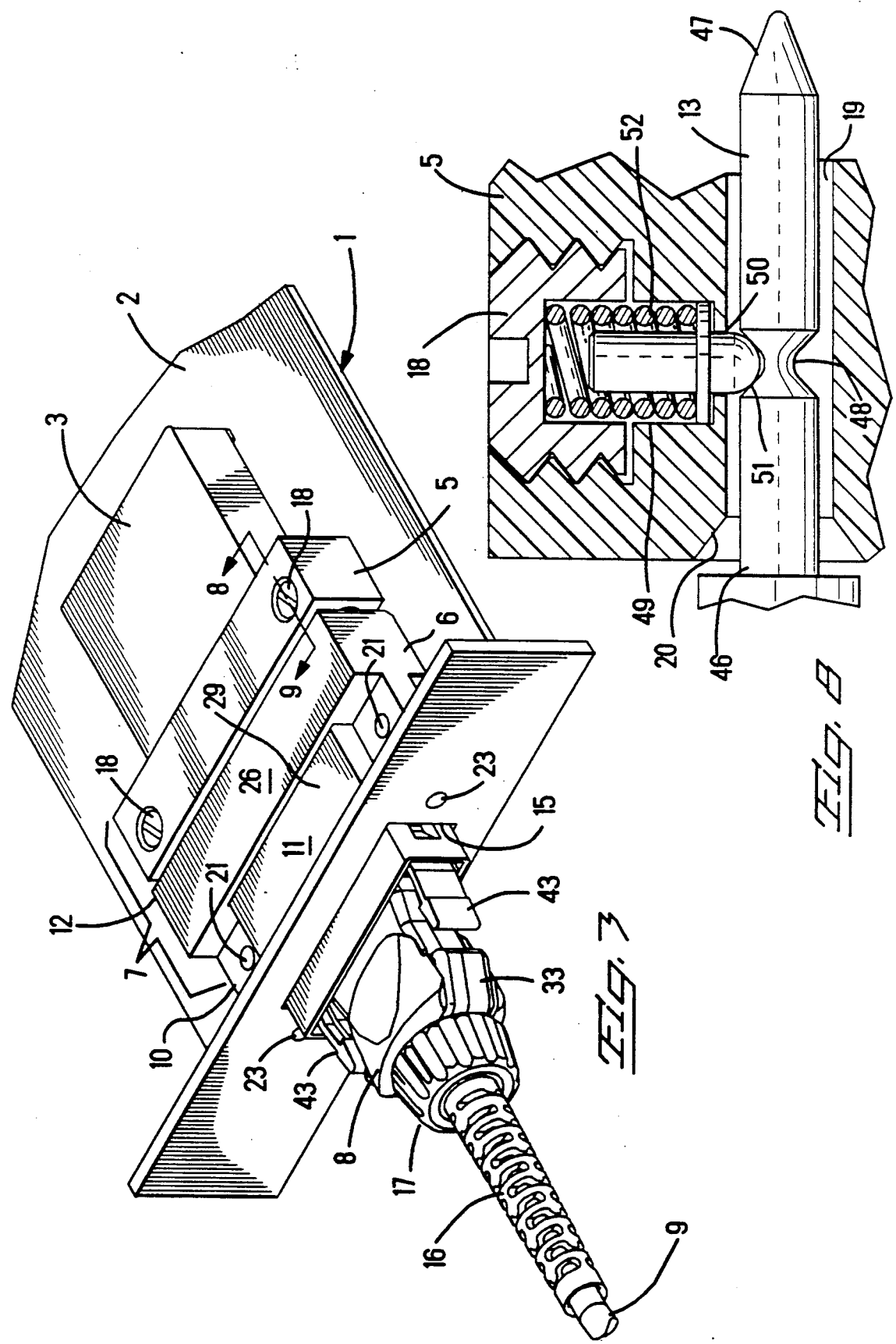

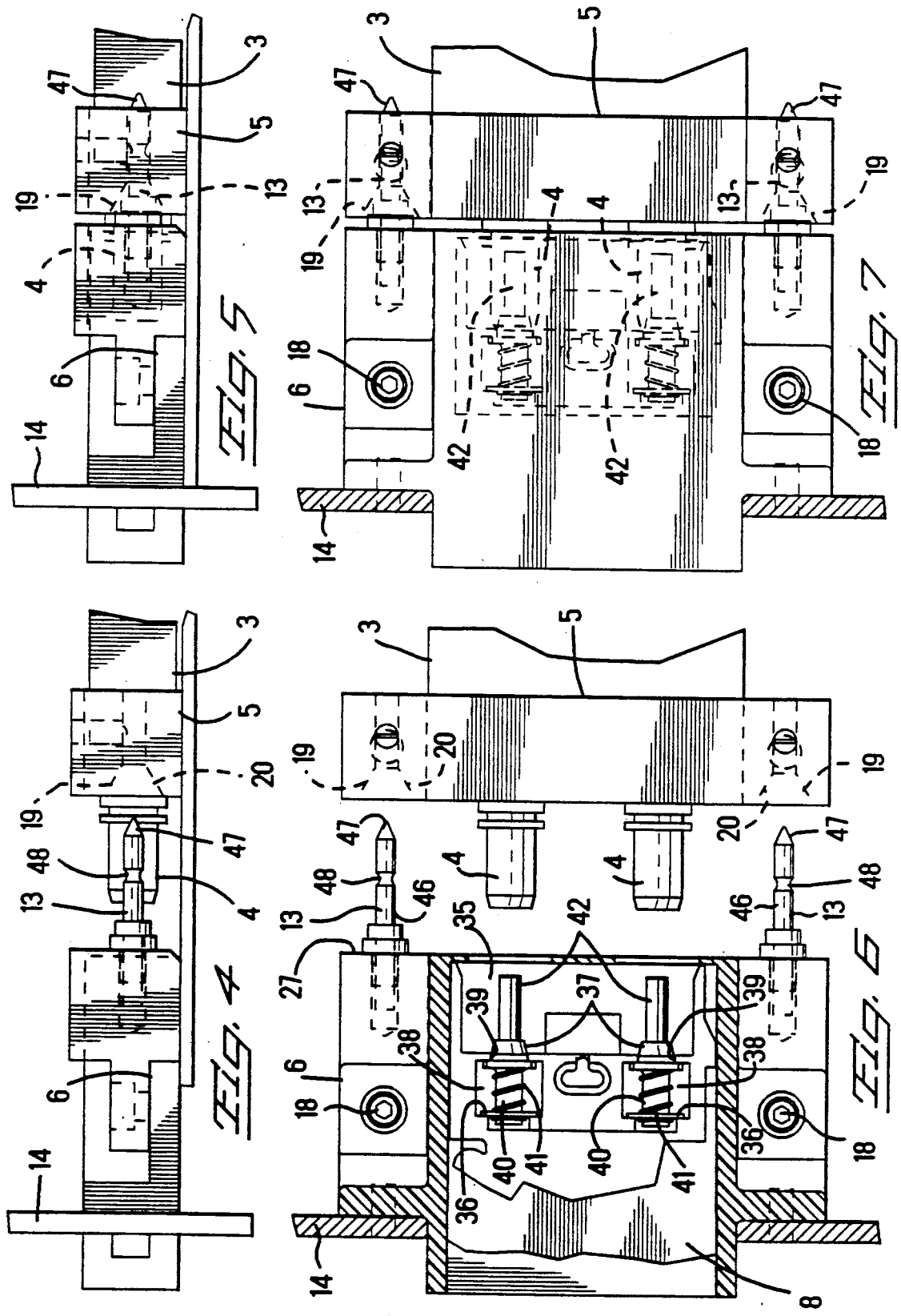

OPTICAL FIBER CONNECTOR WITH ALIGNMENT FEATURE

FIELD OF THE INVENTION

The present invention relates to an optical fiber connector with an alignment assembly for positioning, aligning, and guiding mating electrical or optical connector halves together.

BACKGROUND OF THE INVENTION

As pointed out in the application of Briggs et al, U.S. Ser. No. 07/549,789 filed July 9, 1990, it is standard practice with respect to mating connectors to provide means which position the connector halves so that the terminals therein are aligned for a proper mating engagement. It is common to provide pins, posts, and projections in one half made to fit within complementary apertures in the other half; both integrally molded with respect to the housings of the connector halves, or added as hardware. One problem associated with interconnecting of connector halves arises when the halves are of different suppliers and are not complementary. In such instances it is necessary to provide an adapter that alters one or both of the connector halves so as to permit interconnection.

It is an object of the present invention to provide an alignment assembly that permits interconnection between connector halves of a variety of types without requiring the providing of an adapter for each such interconnection. It is further an object to provide a guide means facilitating mounting of a connector half on a mounting structure such as a printed circuit board in a simple and novel manner, and for intermating electrical and optical connectors to join cables to circuit boards. It is particularly an object of the present invention to provide an improved connection between a board mounted transmitter and/or receiver and a shrouded plug connector, as for example, a connection between a Fiber Distributed Data Interface (FDDI) and a connector of the Fixed Shroud Duplex (FSD) type.

SUMMARY OF THE INVENTION

The present invention relates to a connector for joining light transmitting fiber cables to a transmitter and/or receiver device. The connector comprises a plug half connector comprising a plug having an axial extending bore for receiving an optical fiber, and a transceiver adapter adapted to axially receive the plug. The transceiver adapter extends axially for aligning the plug relative to the transmitter and/or receiver device. The transceiver adapter further has a forward mating face, and pin, beveled at the end thereof and fixed to the forward mating face of the adapter and extending forward of the plug half connector. Further included is a yoke half connector attached to and integral with the transmitter and/or receiver device and having an aperture which is beveled to receive the pin.

The transceiver adapter of the connector may be an integral two-part structure comprising a transceiver shroud and an alignment adapter, or the transceiver adapter may be a single molded integral structure characterized by a transceiver shroud portion and an alignment pin adapter portion. In the instance that the transceiver adapter is a two-part structure, the transceiver shroud and the alignment pin adapter are secured together with inter-engaging means such as a bolt to form the integral two part structure. In either instance, the transceiver shroud is adapted to axially receive the plug. The shroud extends axially for aligning the plug relative to the shroud. The alignment adapter has the pin extending therefrom and has a face coextensive with the mating face of the transceiver shroud.

The connector usually has two pins each beveled at the end thereof and each fixed to the forward mating face of the transceiver adapter. The pins extend forward of the plug half connector. Each of the pins has an annular groove and the yoke half has a spring biased plunger within its aperture. The pin imposes into the groove to provide latching of the pin characterized by a positive retention force. Usually the yoke half connector additionally comprises a structure wherein each of the apertures is intersected by a bore. Each of the spring biased plungers resides within a respective intersecting bore with the end of each plunger imposing from the bore into the aperture and into the groove of the pin.

The transmitter/receiver device has mounts projecting therefrom for connecting each transmitter/receiver to a respective optical fiber cable extending forward within the axial bore of the plug. The plug includes openings for receiving respective mounts into its axial bore to permit connection with respective optical fiber cables. Each opening is unobstructed to permit connecting of the mounts to within the plug along a direct line longitudinal to the axis of each mount.

Further, the connector may comprise means associated with the plug for securing the plug within the transceiver adapter. The means may be at least one deflectable latch, with the latch cooperating with a respective port of the transceiver adapter. Further included may be a strain relief means including a tubular member with integral means for distributing bending substantially along the length of the strain relief. Means may be included on the plug and on the strain relief means to retain the strain relief means and the plug in assembled relation. With this, the plug is provided with a threaded end, and, further provided is a cap with a threaded bore complementary to the threaded end and having a bore of deceased opening for capturing the strain relief.

BRIEF DESCRIPTION OF THE DRAWINGS

FIG. 1 is a perspective view, partially exploded, of the connector of the present invention along with a cover and transmitter and/or receiver device.

FIG. 2 is a perspective view showing connector halves preparatory to mating along with associated mounting structures.

FIG. 2A is a perspective view of one of the connector halves shown in FIG. 2.

FIG. 3 is a view of the structures shown in FIG. 1 following mating.

FIG. 4 is a cut away elevation view of the connector before mating and FIG. 5 is a cut away elevation view of the connector after mating.

FIG. 6 is a cut away top view of the connector before mating and FIG. 7 is a cut away top view of the connector after mating.

FIG. 8 is a detail view along the line 8—8 of FIG. 3.

DESCRIPTION OF A PREFERRED EMBODIMENT

Referring to FIGS. 1, 2 and 3, an electronic package 1 is shown to include a mounting structure 2 which may be a printed circuit board carrying circuit traces to electronic components such as logic and memory devices. Mounted on structure 2 is a transmitter/receiver device 3 which includes a pair of signal ports 4 suitably interconnected to components which convert electrical to optical and optical to electrical signals, i.e. transmitters and receivers. Shown also, is yoke 5 which is a connector half. and with half structure 6 comprises the connector 7 of the present invention as hereinafter described.

Half structure 6 includes plug 8 terminating a cable 9 to a forward portion, transceiver adapter 10. Transceiver adapter 10 is shown in FIGS. 2 and 2A as a two part structure comprising a transceiver shroud 11 and alignment adapter 12. Transceiver shroud 11 is adapted to axially receive plug 8. The shroud 11 extends axially for aligning the plug relative to the transmitter/receiver device 3. The alignment adapter 12 has pins 13 extending therefrom. The connector half 6 is mounted as indicated in a mounting structure which may be considered, in the embodiment here involved, as a panel front 14 which encloses the interconnection when the connector halves 5, 6 are mated through port 15 of the panel front 14.

The plug half connector 6 further comprises strain relief means 16 which is a tubular member with integral means for distributing bending substantially along its length. The plug 8 has a threaded end (not shown). Cap 17 has a threaded bore complementary to the end of the plug 8, and has a bore of decreased opening for capturing the strain relief 16 when the cap 17 is inter-engaged with the threaded end of the plug 8.

Referring to FIGS. 1 through 7, yoke 5 is shown as a yoke-shaped frame which fits over, and along the same centerline as, the transmitter/receiver 3 and secures to circuit board 2 by means of bolts through holes 18. The yoke 5 has apertures 19 which are beveled 20 to receive pins 13 which, upon connection, are guided into the apertures 19 by the beveling 20.

The transceiver adapter 10 may be a molded integral structure characterized by a transceiver shroud portion 11 and an alignment pin adapter portion 12 or the adapter 10 may be a two part structure, as shown in the drawings, comprising a transceiver shroud part 11 and an alignment pin adapter part 12 secured together with an inter-engaging means to form said integral two part structure-the transceiver adapter 10. The inter-engaging means may be a bolt through the commonly aligned holes 21 of the adapter portion 12 and holes 22 of the transceiver shroud 11, and further bolts through commonly aligned holes 23 of panel front 14, horizontally disposed holes 24 of the transceiver shroud 11 and thence through commonly aligned holes 21 of the alignment adapter 12 to, not only interconnect the shroud 11 and the adapter 12, but also to the secure the resulting transceiver adapter 10 to the panel front 14.

Alignment adapter 12 is in the form of a frame 26 having a mating face 27 with pins 13 extending therefrom, and rearward flanges 25, which accommodate the holes 21. Each pin 13 is a cylindrical body with forward beveled face and annular groove. When interconnected to form transceiver adapter 10, the frame 26 of the adapter 12 straddles shroud 11, and mating face 27 forms a common mating face with coextensive forward mating face 28 of shroud 11. Transceiver shroud 11 consists of a body 29 having forward mating face 28, axial cavity 30 to receive the plug 8, extending flanges 31 with holes 22 and 24, and latch ports 32 to both sides of body 29.

Plug 8 is constructed for disconnect coupling through means of transceiver adapter 10 and is a hollow body of molded upper cover 33 and molded lower cover 34. The covers 33, 34 are of insulated plastic material formed by molding into a shape that has an exterior with dimensions that intermate with the transmitter/receiver via transceiver adapter 10. Upper cover 33 and lower cover 34 are complementarily contoured in their interiors so as to form a profiled passageway 35. Upper cover 33 intermates with lower cover 34 by snap-in connection. Threaded cap 17 secures the upper cover 33 together with the lower cover 34 to encompass and provide an enclosure for the optical fibers of optical cable 9. Rear flanges 36 and truncated, cone-shaped, lead-in sections 37 are formed so as to nestle within complementary cavities 38 and 39 formed at and by the closure of upper cover 33 and lower cover 34. Within the cavities 38, are ferrule members 40 and springs 41 which bias the lead-in sections 37 to form a secure fit within the cavities 39. Extending from ferrule members 40 are fiber plugs 42 which enclose ends of the optical fibers with exposed end faces directed toward transmitter/receiver signal ports 4. The plug 8 is secured within the transceiver adapter 10 by biased spring fit of latches 43 through latch ports 32.

Further shown in FIGS. 4, 5, 6, 7 and 8 is transmitter/receiver device 3 and yoke half connector 5. Yoke half connector 5 is attached to and is integral with the transmitter and/or receiver device and has apertures 19 having beveling 20. Transmitter/receiver ports 4 have square bases which form flanges 44 which functioned with prior art transceiver adapters, as described hereinafter.

With specific reference to FIG. 8, shown is the common mating face 27 of the alignment adapter 12 and the mating face 28 of the shroud 11. Notable is that alignment adapter 12 has spacing 45 which permits accommodation of shroud 11 and access to the fiber plugs 42 for connection with signal ports 4 of device 3 as hereinafter described. Also shown are pins 13, each with barrel body 46, beveled leading tip 47 and annular groove 48. Shown also is the lower cover 34 and fiber plugs 42 of plug 8.

During connection of plug connector half 6 with yoke connector half 5, the apertures 19 of yoke half connector 5 receive respective pins 13 of plug connector half 6 with each bevel 20 interacting with the respective bevel of each leading tip 47 to guide the barrel 46 of each pin 13 into a receiving aperture 19. Simultaneously, respective mounts 42 pass through openings 45 in the mating face 27 of alignment adapter 12 and are received within respective signal ports 4 of the transmitter/receiver 3 thereby connecting each transmitter and/or receiver 3 to a respective optical fiber. Openings 45 are unobstructed and in connecting with respective mounts 42, the ports 4 pass to within plug 8 along a direct line longitudinal to the axis of each mount 42. In contrast, prior art devices have been provided characterized by transceiver adapters 10 having lips along edges of openings 45 to permit latching to flanges 44 of the transmitter/receiver device 3 signal ports 4. The present invention permits easy removal and replacement of circuit boards 2 in that associated transceiver adapters 10 need not be separately removed, but rather the board 2 may simply be removed from the transceiver adapter 10 of the present invention and replaced with another board without requiring replacement of the connector half associated with plug 8.

FIG. 9 is a detail of the pin connection between alignment adapter 12 and yoke half connector 5. Shown in cut away is pin 13 imposing into aperture 19 of yoke half 5. Intersecting aperture 19 is bore 49 having plunger 50. The head 51 of the plunger 50 is biased by spring 52 into engagement with the annular groove 48 of the pin 13. This combination provides a positive force for locking the transceiver adapter 10 to transmitter/receiver device 3 via yoke half connector 5.

While what has been described constitutes a presently preferred embodiment of the invention, it should be recognized that the connector 7 of the present invention may take other forms so long as it is characterized by the half plug connector 6 comprising a plug 8 and a transceiver adapter 10 and a yoke half 5 attached to and integral with the transceiver and/or receiver device 3. Accordingly, it should be understood that the invention is to be limited only insofar as required by the scope of the following claims.

We claim:

1. A connector for joining light transmitting fiber cables to a transmitter and/or receiver device comprising:
   a plug half connector comprising; a plug having axial extending bore for receiving an optical fiber; a transceiver adapter adapted to axially receive said plug and extending axially for aligning said plug relative to said transmitter and/or receiver device, and further having forward mating face; and pin, beveled at the end thereof and fixed to the forward mating face of said transceiver adapter and extending forward of said plug half connector; and
   yoke half connector attached to and integral with said transmitter and/or receiver device and having aperture therein beveled to receive said pin to be guided into said aperture by said beveling.

2. The connector of claim 1 wherein said transceiver adapter is an integral two-part structure comprising; a transceiver shroud adapted to axially receive said plug and extending axially for aligning said plug relative to said transmitter and/or receiver device, and further having forward mating face; and alignment adapter having said pin extending therefrom and having mating face coextensive with the mating face of said transceiver shroud.

3. The connector of claim 2 having two pins each beveled at the end thereof and each fixed to the forward mating face of said transceiver adapter and extending forward of said plug half connector.

4. The connector of claim 3 wherein each of said pins has an annular groove and said yoke half connector has spring biased plunger within said aperture and imposing into said groove to provide latching of said pin characterized by a positive retention force.

5. The connector of claim 4 wherein said yoke half connector additionally comprising each o said apertures intersected by a bore and further wherein each of said spring biased plunger resides with a respective intersecting bore with the end of each plunger imposing from said bore into said aperture and into said groove.

6. The connector of claim 3 or claim 5 for joining light transmitting fiber cables to a transmitter and/or receiver device said device having mounts projecting therefrom for connecting each transmitter and/or receiver to a respective optical fiber cable extending forward within the axial bore of said plug wherein said first part includes openings for receiving respective mounts into said axial bore to permit connection with respective optical fiber cables.

7. The connector of claim 6 wherein each said opening is unobstructed to permit connecting of said mounts to within said plug along a direct line longitudinal to the axis of each mount.

8. The connector of claim 3 or claim 7 further comprising means associated with said plug for securing said plug within said transceiver adapter, said means including at least one deflectable latch, said latch cooperating with a port of said transceiver adapter.

9. The connector of claim 3 wherein said transceiver shroud and said alignment pin adapter are secured together with inter-engaging means to form said integral two part structure.

10. The connector of claim 3 wherein said transceiver shroud and said alignment pin adapter is a molded integral structure characterized by a transceiver shroud portion and an alignment pin adapter portion.

11. The connector of claim 3 wherein said plug half connector further comprises strain relief means including a tubular member with integral means for distributing bending substantially along the length thereof; and means on said plug and on said strain relief means inter-engaging with one another to retain said strain relief means and said plug in assembled relation.

12. The connector of claim 11 wherein said means for inter-engaging said plug and said strain relief with one another comprises threaded end of said plug and cap with threaded bore complementary to the said threaded end and having bore of deceased opening for capturing said strain relief.

* * * * *

UNITED STATES PATENT OFFICE

CERTIFICATE OF CORRECTION

Patent No. 5,091,991        Dated February 25, 1992

Inventor(s) Robert C. Briggs et al.

It is certified that error(s) appear in the above-identified patent and that said Letters Patent is hereby corrected as shown below:

On the Cover:

Under section [73] Assignee - delete "Amp" and insert --AMP--.

In the Claims:

Claim 5, column 6, line 7 - delete "o" and insert --of--.

Signed and Sealed this

Twenty-seventh Day of April, 1993

Attest:

MICHAEL K. KIRK

*Attesting Officer*   Acting Commissioner of Patents and Trademarks